(12) United States Patent
Segerman et al.

(10) Patent No.: US 11,702,327 B2
(45) Date of Patent: Jul. 18, 2023

(54) APPARATUS FOR BRANCHED SCISSOR LINKAGE AND ASSOCIATED AUXETIC MECHANISMS

(71) Applicant: The Board of Regents for Oklahoma State University, Stillwater, OK (US)

(72) Inventors: Henry Segerman, Stillwater, OK (US); William Segerman, Brighton (GB)

(73) Assignee: The Board of Regents for Oklahoma State University, Stillwater, OK (US)

( * ) Notice: Subject to any disclaimer, the term of this patent is extended or adjusted under 35 U.S.C. 154(b) by 776 days.

(21) Appl. No.: 16/672,796

(22) Filed: Nov. 4, 2019

(65) Prior Publication Data

US 2020/0062561 A1    Feb. 27, 2020

Related U.S. Application Data

(63) Continuation-in-part of application No. PCT/US2018/031815, filed on May 9, 2018.
(Continued)

(51) Int. Cl.
*B66F 7/06* (2006.01)
*B66F 7/28* (2006.01)
(Continued)

(52) U.S. Cl.
CPC ............ *B66F 7/0666* (2013.01); *B25B 9/00* (2013.01); *B66F 3/22* (2013.01); *B66F 7/28* (2013.01); *B25J 1/06* (2013.01); *B66F 11/042* (2013.01)

(58) Field of Classification Search
CPC .. B66F 3/22; B66F 7/0666; B66F 7/28; B66F 11/042; E04B 1/3211
(Continued)

(56) References Cited

U.S. PATENT DOCUMENTS 2,569,354 A * 9/1951 Tracy ................... B23Q 1/5481
266/63
4,055,329 A 10/1977 Hammond
(Continued)

FOREIGN PATENT DOCUMENTS

CN    102180427 A  *  6/2011
CN    201882857 U  *  6/2011
(Continued)

OTHER PUBLICATIONS

PCT International Search Report and Written Opinion_PCT/US2018/031815 dated Aug. 1, 2018.
(Continued)

*Primary Examiner* — Mahdi H Nejad
(74) *Attorney, Agent, or Firm* — Fellers, Snider, Blankenship, Bailey & Tippens, P.C.; Terry L. Watt

(57) ABSTRACT

According to one embodiment, there is taught herein a family of "branched" variants of the traditional scissor mechanism, in which each stage is formed from more than two arms, joined at their midpoints by a branched rivet. In one embodiment arms in adjacent stages are joined at their endpoints with joints that allow for rotation in a single plane. Each resulting mechanism has one degree of freedom in its motion. It deploys from a compact, collapsed state to an extended state. One embodiment is a grasping member that is mechanically coupled to a scissor mechanism so that when scissor mechanism is collapsed the grasping member is open. Then, when the scissor mechanism is extended the grasping member becomes closed.

13 Claims, 6 Drawing Sheets

Related U.S. Application Data

(60) Provisional application No. 62/754,709, filed on Nov. 2, 2018, provisional application No. 62/503,431, filed on May 9, 2017.

(51) Int. Cl.
*B66F 3/22* (2006.01)
*B25B 9/00* (2006.01)
*B25J 1/06* (2006.01)
*B66F 11/04* (2006.01)

(58) Field of Classification Search
USPC .......................................... 52/109, 646, 81.2
See application file for complete search history.

(56) References Cited

U.S. PATENT DOCUMENTS

| | | |
|---|---|---|
| 4,942,700 A | 7/1990 | Hoberman |
| 5,024,031 A | 6/1991 | Hoberman |
| 5,113,972 A * | 5/1992 | Haak, Sr. .................. B66F 3/22 248/69 |
| 6,739,098 B2 | 5/2004 | Hoberman |
| 7,644,721 B2 | 1/2010 | Hoberman et al. |
| 8,733,508 B2 | 5/2014 | Bacon |
| 8,827,246 B2 | 9/2014 | Swasey et al. |

FOREIGN PATENT DOCUMENTS

| | | | |
|---|---|---|---|
| CN | 102180427 A | * | 9/2011 |
| CN | 102180427 A | * | 9/2011 |
| CN | 201882857 U | * | 9/2011 |
| CN | 204778708 U | * | 11/2015 |

OTHER PUBLICATIONS

Hua, et al., Design and Analysis in Multiple-Scissor-Linkage Applied to the Robotics Arm, 2015, pp. 482-485, Atlantis Press, U.S. Wikipedia, "Sarrus Linkage", printed Aug. 2, 2022.

* cited by examiner

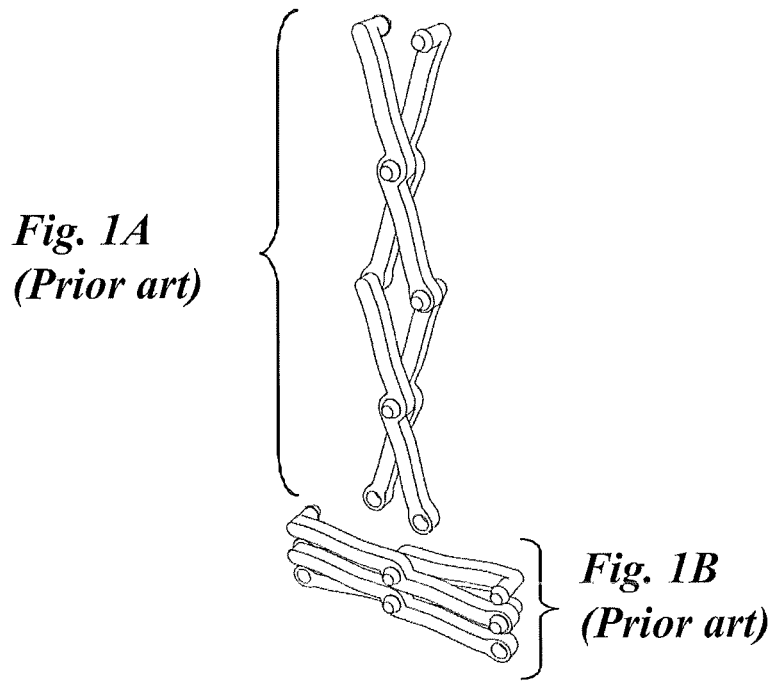
Fig. 1A (Prior art)
Fig. 1B (Prior art)
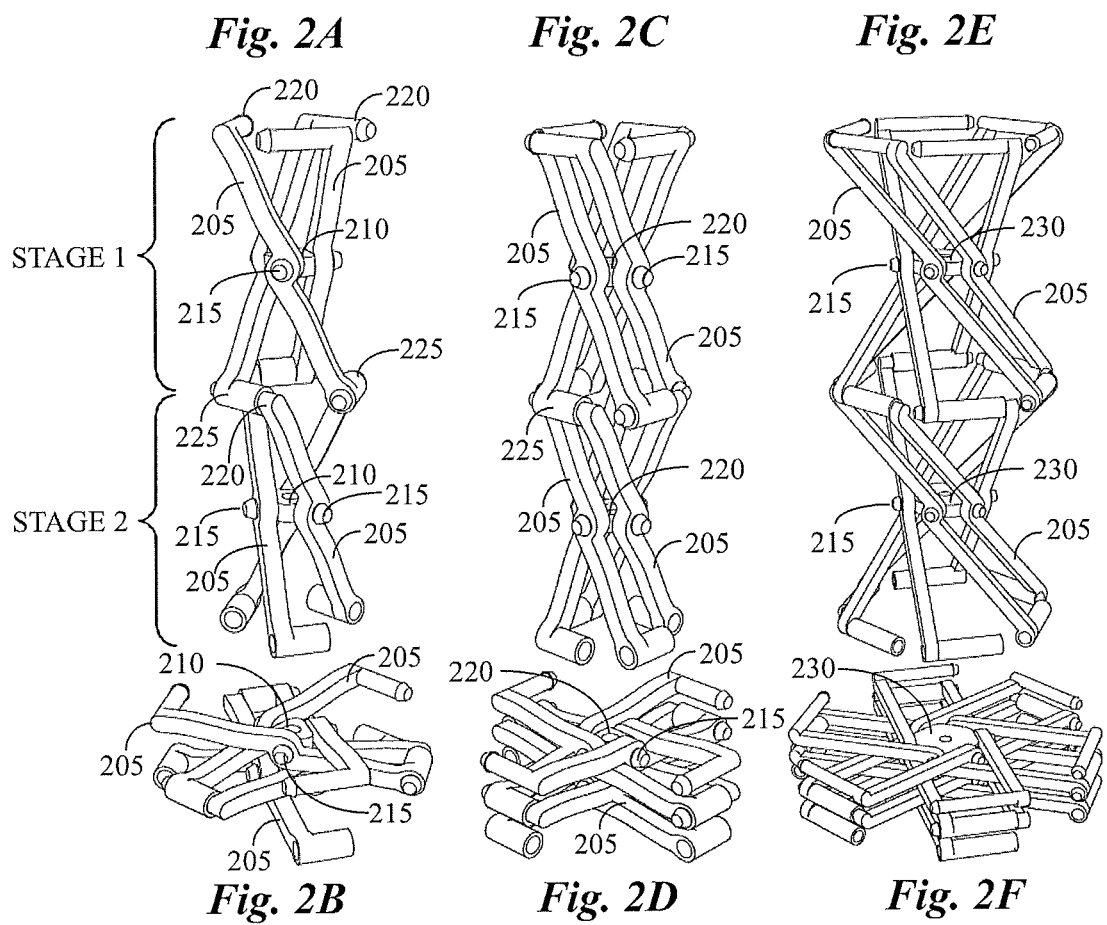
Fig. 2A  Fig. 2C  Fig. 2E
Fig. 2B  Fig. 2D  Fig. 2F

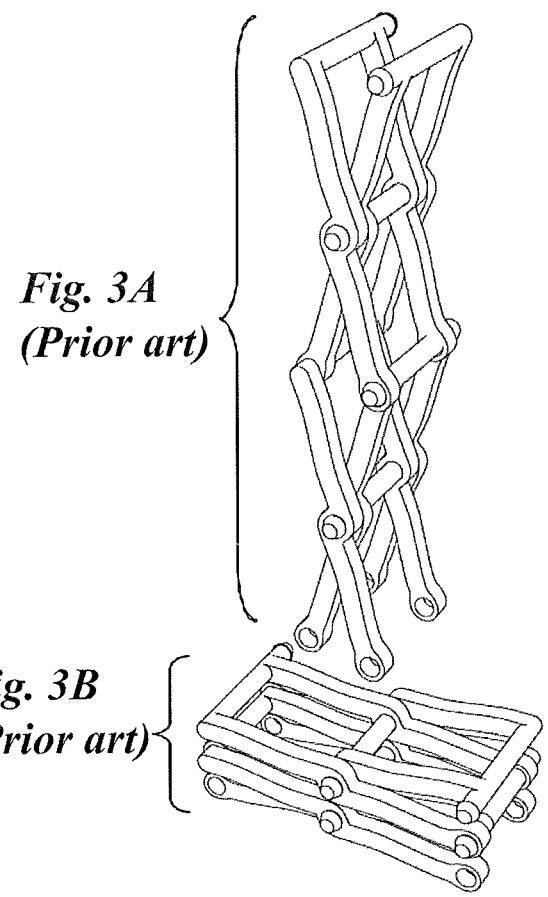
*Fig. 3A (Prior art)*
*Fig. 3B (Prior art)*
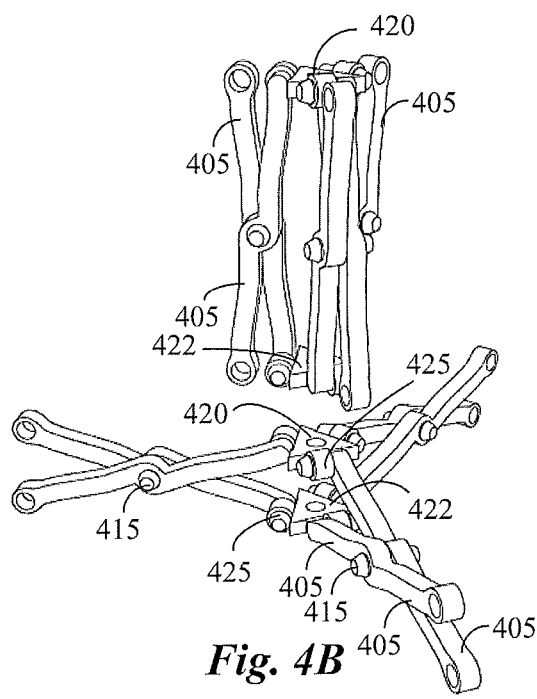
*Fig. 4A*
*Fig. 4B*
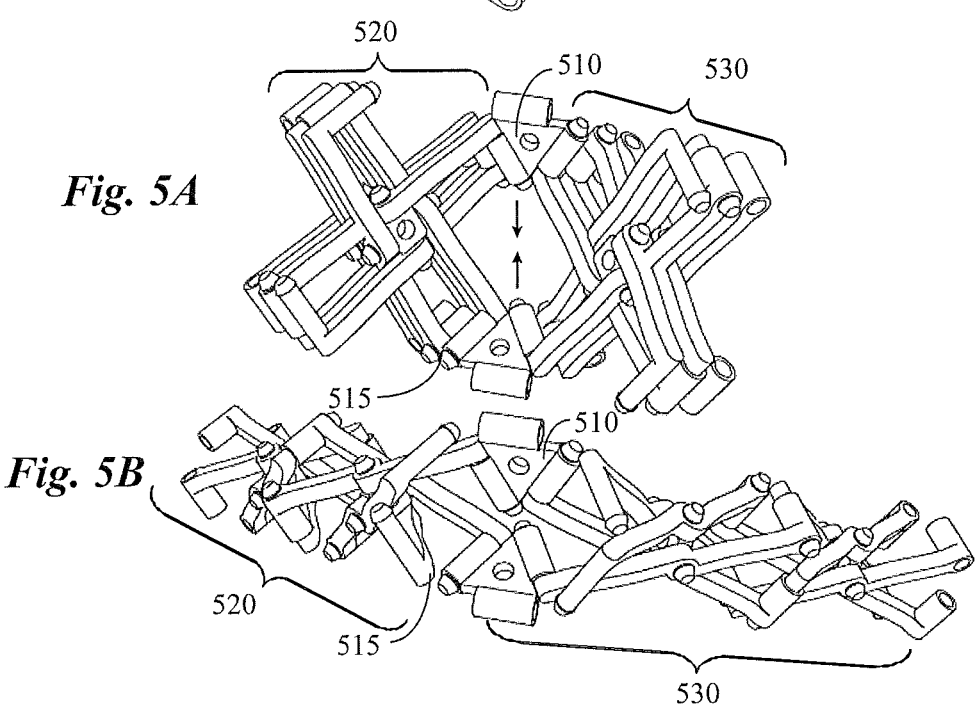
*Fig. 5A*
*Fig. 5B*

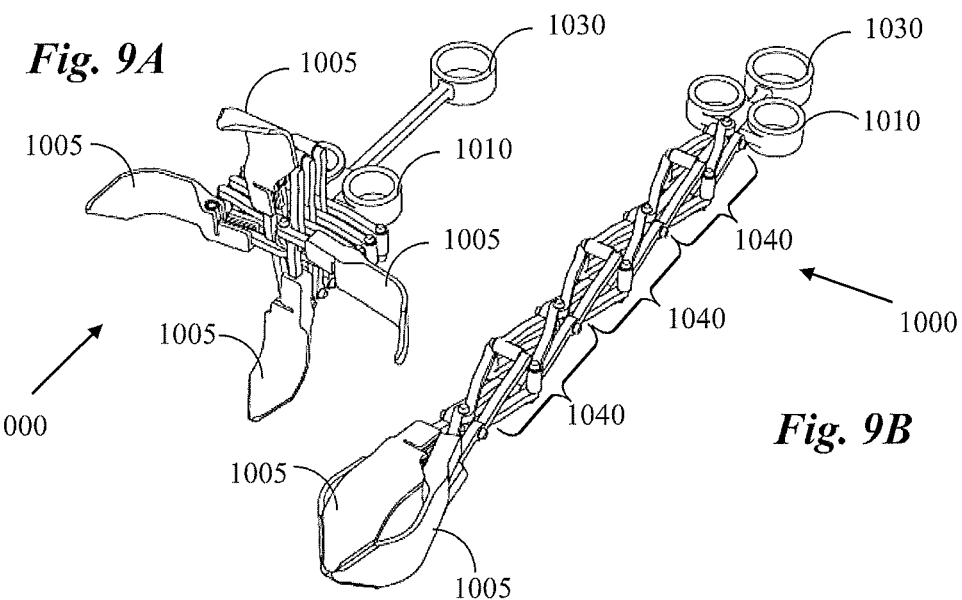
*Fig. 9A*
*Fig. 9B*
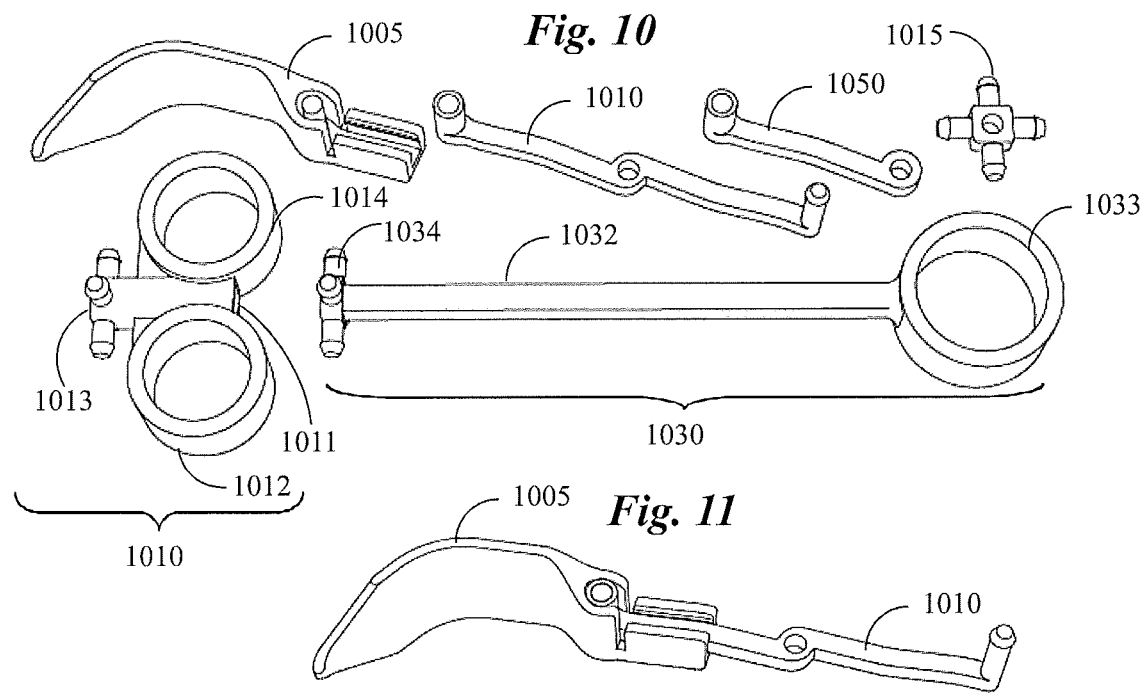
*Fig. 10*
*Fig. 11*

APPARATUS FOR BRANCHED SCISSOR LINKAGE AND ASSOCIATED AUXETIC MECHANISMS

CROSS REFERENCE TO RELATED APPLICATIONS

This application claims the benefit of U.S. Provisional Patent Application Ser. No. 62/754,709 filed on Nov. 2, 2018, and incorporates said provisional application by reference into this document as if fully set out at this point. This application is a continuation-in-part of co-pending PCT/US2018/031815, filed May 9, 2018, and incorporates said PCT application by reference into this document as if fully set out at this point. Co-pending PCT/US2018/031815 claims the benefit of U.S. Provisional Patent application Ser. No. 62/503,431, filed May 9, 2017.

TECHNICAL FIELD

This disclosure relates generally to mechanical linkages and, more particularly, to scissor linkages and associated auxetic mechanisms.

BACKGROUND

The traditional scissor linkage as shown in FIGS. 1A and 1B has one degree of freedom in its motion: it deploys from a compact, collapsed state (FIG. 1B) to an extended state (FIG. 1A). The linkage consists of a number of stages, each stage consisting of two arms joined at their midpoints by a rivet that allows the arms to rotate against each other. Arms in adjacent stages are joined at their endpoints with joints that again allow for rotation.

Although these sorts of devices are in common use they are subject to certain disadvantages including, among others, that the traditional scissor linkage is weak against bending forces that act perpendicular to the plane in which the mechanism lies, although it is strong against forces within the plane. The usual fix to this weakness in the traditional scissor linkage (as used, for example, in electric and hydraulic scissor lifts) is to use two parallel scissor linkages, connected across at the hinge points, as shown in FIGS. 3A and 3B. This is effective in certain circumstances, although it introduces an asymmetry between the different directions: the horizontal direction in the plane of the scissor linkages acts differently from the horizontal direction perpendicular to the plane of the scissor linkages. For some use cases, e.g. a robotic arm, it may be useful to have the same level of stability in all orientations, which the branched linkages provide.

As such, what is needed is a scissor linkage that does not suffer from the disadvantages of the prior art.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to an embodiment, there is taught herein a family of "branched" variants of the traditional scissor mechanism, in which each stage is formed from more than two arms, each joined preferably at their respective midpoints by a "branched" rivet. In one embodiment, arms in adjacent stages are joined at their endpoints with joints that allow for rotation. Each resulting mechanism has one degree of freedom in its motion. It deploys from a compact, collapsed state to an extended state. FIGS. 2A to 2F show examples with three (FIGS. 2A and 2B), four (FIGS. 2C and 2D) and six (FIGS. 2E and 2F) arms. The arms in the embodiment of FIGS. 2A, 2C, and 2E are identical, so such a mechanism could be taken apart and reconfigured into another arrangement, only needing a different branched rivet part in order to affect the reconfiguration.

These designs have a number of potential advantages over the traditional scissor linkage. For example:

(1) More independent interlinked parts are involved. Particularly for the versions with four or more arms per stage, this makes the mechanisms stronger and more stable in general.

(2) With more arms at each end of the linkage, more motors can be used to move the mechanism, so greater force can be applied.

(3) The traditional scissor linkage is weak against bending forces that act perpendicular to the plane in which the mechanism lies, although it is strong against forces within the plane. Various embodiments of the branched mechanisms disclosed herein are strong against forces from any direction.

According to another embodiment, there is provided a grasping or grabbing mechanism suitable for use with the scissor linkage disclosed herein. In one variation, the device consists of a syringe-like handle attached to a four-armed branched scissor linkage, which has a set of claws attached at the other end. This embodiment has a number of useful properties:

(1) The mechanism is compact when retracted, but significantly extends the user's reach when extended.

(2) Even when extended, the mechanism is strong against lateral forces in all directions. This allows it, for example, to support the weight of the grasped object no matter the orientation in which the device is held.

(3) The claws approach an object from four directions as opposed to the two in most grabber tools, enhancing the ability of the device to securely grasp the object.

(4) The grasping motion of the claws is a natural consequence of the action of the branched scissor mechanism, requiring no additional moving parts.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIGS. 1A and 1B contains a schematic illustration of a prior art scissor linkage extended and collapsed (FIG. 1B).

FIGS. 2A-2F contain three different exemplary embodiments with three arms (FIGS. 2A expanded and 2B collapsed), four arms (FIGS. 2C expanded and 2D collapsed), and six arms (FIGS. 2E expanded and 2F collapsed).

FIGS. 3A and 3B contains a schematic illustration of a prior art parallel standard scissor linkage expanded (FIG. 3A) and collapsed (FIG. 3B).

FIGS. 4A and 4B contain an embodiment that utilizes connections between scissor linkages similar to those found in the Hoberman sphere in an expanded (FIG. 4A) and collapsed (FIG. 4B) configuration.

FIGS. 5A and 5B contain an exemplary four-armed branched scissor linkage combination in an expanded (FIG. 5A) and collapsed (FIG. 5B) configuration in which two linkages are jointed together at a corner.

FIGS. 9A and 9B contain illustrations of an embodiment where the clawed grasping mechanism is in a retracted (9A) and extended (9B) condition.

FIG. 10 contains various components of the embodiment of FIG. 10. Parts used in this embodiment of the extendable grabbing device. Top row: claw, arm, half-arm, branched rivet. Bottom row: syringe fingers part, syringe thumb part.

FIG. 11 illustrates how the law is attached to an embodiment of the scissor linkage arm.

DETAILED DESCRIPTION

Figure 6A:
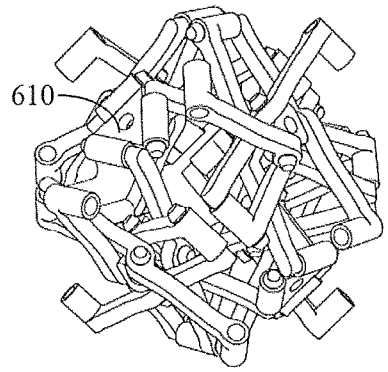
FIGS. 6A and 6B contain a schematic illustration of a configuration in which four three-armed branched scissor linkages come together at a node in its retracted state (6A) and its extended state (6B).

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment, there is taught herein a family of "branched" variants of the traditional scissor mechanism, in which each stage is formed from three or more equal-length arms, joined at their midpoints by a "branched" rivet. Note that for purposes of the instant disclosure, the term branched rivet will be used to describe, in a first embodiment, a device that contains three or more radially projecting coplanar protrusions substantially equally spaced about its perimeter, although that spacing is not a requirement. In some embodiments, the protrusions will be threaded on their outer termini but that is not a requirement. In other cases, rather than protrusions, holes in the branched rivet will be provided instead, which holes might be internally threaded. Note, although various embodiments are designed so that each arm is mounted to the branched rivet at its midpoint, that is only one configuration that might be employed since, in some cases, mounting the arms other than at their midpoints would allow additional leverage to be applied. For example, a group of asymmetrically mounted arms could be arranged so that increased movement distance at one end could provide increased force at the other end. The offset rivet position could also be usefully employed in the middle of the linkage, to change the distance moved/force ratio as needed. That being said, for purposes of the instant disclosure when it is said that multiple equal length arms are mounted on the same branched rivet, it should be noted that the mounting could be symmetric (at the midpoint of each arm) or asymmetric (the mounting point of each arm is offset from the midpoint by the same amount so that each arm extends above/below the mounting point by the same amount).

In one embodiment, the branched rivet might have holes equally spaced about its perimeter but all must generally lie in the same plane. When threaded holes are provided, it is anticipated that a matching threaded bolt or similar structure will be used to attach the arms described below to the branched rivet. Note that, for purposes of the instant disclosure, when the branched rivet is said to have protrusions, that term should be understood to include both instances where the protrusions are integral to the device as well as instances where the there are holes into which bolts, rivets, etc., are removably or permanently inserted. It should also include instances where the protrusions are equally spaced around the perimeter of the device as well as when they are not.

In some variations the branched rivet might be made of metal but other variations are certainly possible (e.g., plastic for small embodiments) and well within the ability of one of ordinary skill in the art to devise.

As is generally indicated in the embodiments of FIGS. 2A-2F, the instant branched scissor linkages 2A, 2C, and 2E generally comprise three or more arms 205 each of which are each rotatably mounted on one of the protrusions of the branched rivet 210. As can be seen, in this particular embodiment each arm 205 is mounted at its midpoint to one of the protrusions of the branched rivet 210 and should be mounted so as to be freely rotatable about that protrusion with a single degree of freedom. In some embodiments, the protrusions of the branched rivet 210 might be surmounted by a nut (if the protrusion is threaded) or a cap 215 which serves to keep the arm 205 mounted on the branched rivet 210. In some embodiments the branched rivet 210 will have a flat upper and lower surface.

In some embodiments, the instant branched scissor linkage will be comprised of two or more stages. In the embodiments of FIGS. 2A-2F, each example 2A, 2C, and 2E is comprised of two identical stages, Stage 1 and Stage 2 assemblies, which are in mechanical communication with each other via rotatable joints. More particularly, the arms 205 in adjacent stages are joined at their endpoints with rotatable joints. Preferably the joints will be rotatable in a single plane. In the example of FIG. 2A, the upper terminus of each Stage 2 assembly arm 205 contains an orthogonally extending rod 220 which is sized to mate with a socket 225 on one of the lower terminus arms 205 of the Stage 1 assembly. As can be seen, this arrangement limits each mated arm to rotation is a single plane. Clearly, the exact means by which the arms in adjacent stages are hinged or otherwise rotatably joined together could take many forms and those of ordinary skill in the art will be able to readily devise alternatives to those presented herein. For purposes of instant disclosure, the hinging component 225 on lower end of an arm in the Stage 1 assembly will generally be referred to as an upper hinge component and the mating part 220 which is situated on the upper end of the an arm in the Stage 2 assembly will be referred to a lower hinge component. As described previously, the upper and lower hinge components must be designed to mate with each other and allow rotation in a single plane or with one degree of freedom.

Further, although it is preferred that the arms 205 in both stages be of the same length, that is not an absolute requirement. In some embodiments, the arm lengths of the arms in the Stage 1 assembly might be different from the lengths of the arms in Stage 2. That being said, it is a requirement that the lengths of all of the arms in a stage must be the same length.

Each resulting mechanism in FIGS. 2A-2F has one degree of freedom in the relative motion of each of the connected arms 205, which means that it can readily deploy from a compact, collapsed state (FIGS. 2B, 2D, and 2F) to an extended state (FIGS. 2A, 2C, and 2E). FIGS. 2A-2F show examples with three, four and six arms 205 in each stage. The arms 205 in each stage of the embodiments of FIGS. 2A, 2C, and 2E are identical, so that a stage with, say, six arms (FIG. 2E) could readily be disassembled and reconfigured into another arrangement, only needing a different branched rivet part 210, 220, or 230 in order to reconfigure the device, with larger branched rivet parts being preferably utilized in the three and four arm versions. Thus, the arms in FIGS. 2E and 2F could also be reconfigured to form the embodiments of FIG. 2A or D, albeit with a smaller sized branched rivet part 210/220 than part 230.

These designs have a number of potential advantages over the traditional scissor linkage. Among them are:
(1) More independent interlinked parts are involved. Particularly for the versions with four or more arms per stage, this makes the mechanisms stronger and more stable in general.
(2) With more arms at each end of the linkage, more motors can be used to move the mechanism, so greater force can be applied.
(3) The traditional scissor linkage is weak against bending forces that act perpendicular to the plane in which the mechanism lies, although it is strong against forces within the plane. Various embodiments of the branched mechanisms disclosed herein are strong against forces from any direction.

In addition to the branched scissor linkages, also taught herein are methods to join them together to make larger structures. One relevant comparison in existing work is with the Hoberman sphere. In the Hoberman sphere, traditional scissor linkages come together at a "node", similar to the configurations shown in FIGS. 4A and 4B. In this embodiment three scissor linkages with arms 405 are rotatably joined 415 at their respective mid points. Each leg is further rotatably joined at one end to either a triangular upper node 420 or a triangular lower node 422, preferably the triangular nodes will have three equal length sides. Each rotatable connection only allows rotation in a single plane, or a single dimension. The net effect that this has is that if one of the three linkages extends, it forces the two triangular connector parts together, which forces the other two linkages to extend. Thus, the entire system has one degree of freedom.

A similar method of connection also works for branched scissor linkages as shown in FIGS. 5A-5B. Here, two four-armed branched scissor linkages 520 and 530 (e.g., as shown in FIGS. 2C and 2D) meet at two triangular connectors 510 and 515. Note that when one of the linkages 520/530 extends, it forces the two triangular connectors 510/515 toward each other which, in turn, forces the other linkage to also extend. These two branched scissor linkages 520/530 are connected in the same way as the linkages in the larger structure in FIGS. 8A and 8B: they are situated at approximately right angles to each other. By altering the angle of the triangular connectors, incident to both branched scissor linkages, the angle between the linkages can be altered.

Figure 6B:
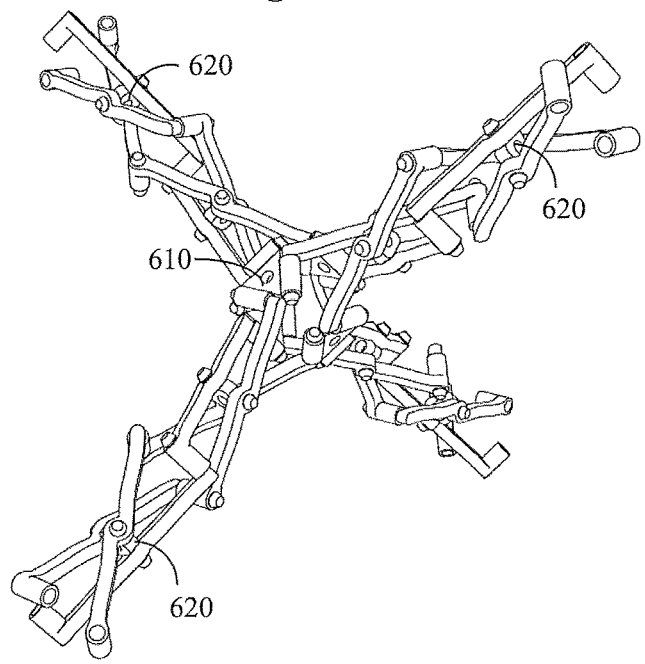
Figure 7A:
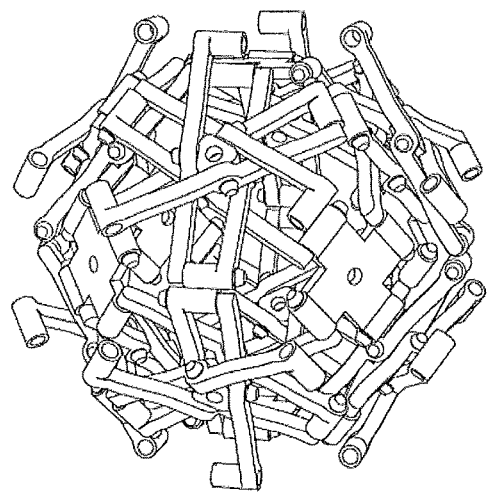
FIGS. 7A and 7B illustrate an arrangement wherein there are eight three-armed branched scissor linkages that come together at a node in a retracted state (7A) and an extended state (7B).
Figure 7B:
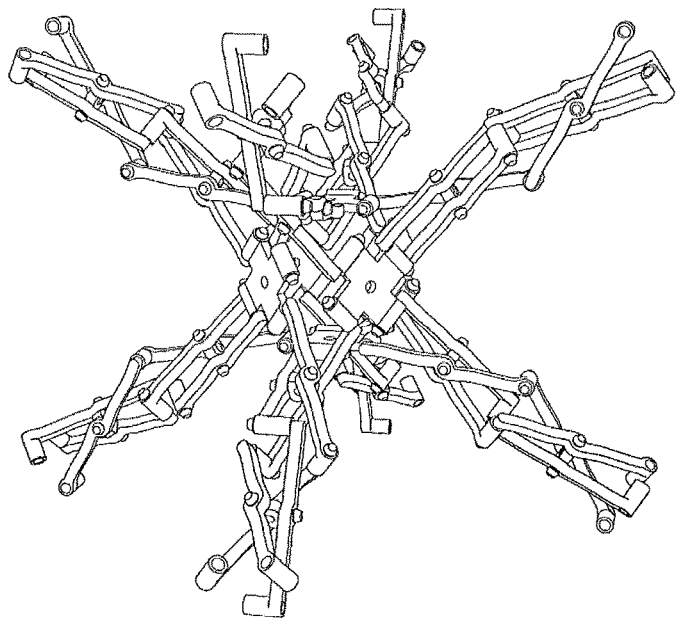

Although obviously three-dimensional, the mechanism in FIGS. 4A and 4B acts in a region close to the horizontal plane through the midpoints of the arms of the scissors. If the mechanism is built outwards with more nodes connecting to more scissor linkages, this plane continues outwards. In the Hoberman sphere, the plane is bent around to form a sphere, but still, the mechanism acts in a region close to a two-dimensional surface. In contrast, the branched scissor mechanism can continue outwards in a truly three-dimensional manner:
(1) Four three-armed branched scissor linkages can meet at a node, joined by four triangular connectors 620 as shown in FIGS. 6A and 6B. The four three-armed linkages are arranged around the node 610 as the vertices of a regular tetrahedron.
(2) Similarly, six four-armed linkages can be joined by eight triangular connectors, with the linkages being arranged around the node as the vertices of a regular octahedron, by continuing the pattern in FIGS. 5A and 5B.
(3) Eight three-armed linkages can be joined by six square connectors, the linkages arranged around the node as the vertices of a cube. See FIGS. 7A and 7B.
(4) Twenty three-armed linkages can be joined by twelve pentagonal connectors.
(5) Twelve five-armed linkages can be joined by twenty triangular connectors.

The above lists some of the most regular kinds of connections. Similar arrangements should be possible where the branched scissor linkages are connected together at arbitrary irregular polyhedral nodes.

Figure 8A:
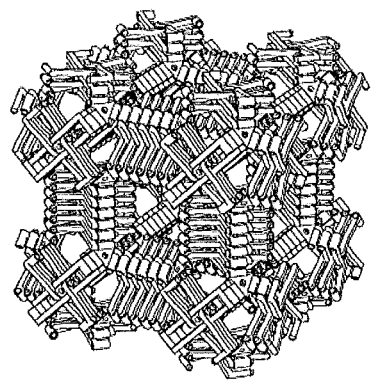
FIGS. 8A and 8B contain illustrations of an embodiment of part of a cubical lattice made from four-armed branched scissor linkages in a retracted state (8A) and an extended state (8B).
Figure 8B:
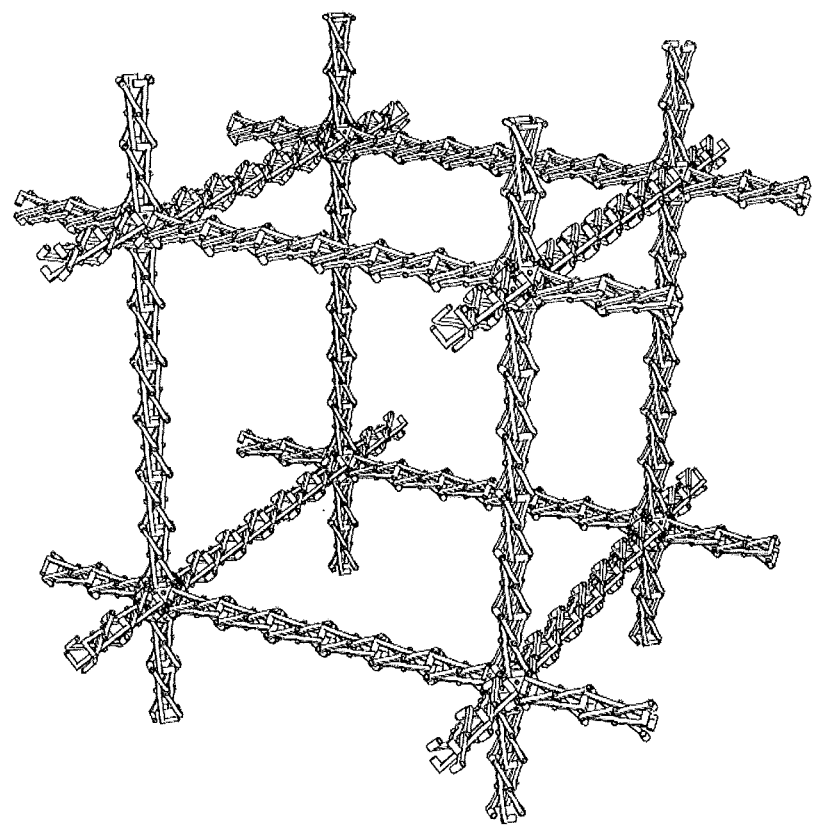

By connecting together branched scissor linkages at nodes, larger auxetic structure can be built:
FIGS. 8A and 8B show part of a cubic lattice built from four-armed branched scissor linkages, connected at nodes as in example (2) above. Any number of stages of the four-armed linkage can be used on each "edge" element between nodes, and the entire structure can be built outwards to make as much of the cubic lattice as is desired.

Using three-armed branched scissor linkages connected as in (1) above, an auxetic structure based on the molecular structure of diamond can be built. In this case, an odd number of stages is required between nodes.

Using three-armed branched scissor linkages connected as in (3) above, an auxetic structure based on the body centered cubic lattice can be built. Again, an odd number of stages is required between nodes.

Similar linkages connected to each other at arbitrary angles could be used to make arbitrary space graphs, not just the regular lattices displayed as examples herein.

Figure 13:
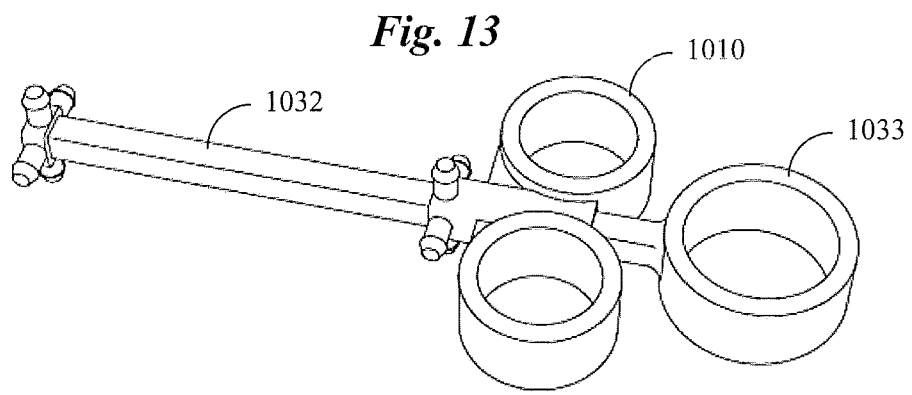
FIG. 13 contains an expanded illustration of the syringe-like component of FIGS. 9A and 9B scissor linkage portion of the clawed grasping embodiment.

According to another embodiment, there is provided the extendable grasping tool 1000, various aspects of which are illustrated in FIGS. 9A-9B through FIG. 13. In this embodiment, the device is made from rigid components of the sort shown in FIGS. 10 and 11, resulting in the arrangement (shown in both retracted and extended form) in FIGS. 9A and 9B.

The arm and branched rivet parts are used to build a branched scissor linkage of a desired length—in this examples three stages 1040 were used. Then four claws 1005 were attached to the end of the branched scissor linkage. In this example a claws clips rigidly onto each arm part (see FIGS. 10A and 10B). Alternatively, a single solid part could be made consisting of an arm that ends in a claw. The claw may be designed differently to better grasp particular kinds of objects. For example, the claw may use a softer material or be designed with ripples, increasing its flexibility so as to provide a gentler grip. Alternatively, serrated teeth could be added to grip softer materials more firmly. The example claw is designed so that the four claws 1005 close shut when the branched scissor linkage is fully extended. The design could be altered so that the four claws 1050 enclose a sealed volume at full extension which could be used, as a specific example, for capturing e.g. insects or delicate sea creatures without harming them.

Figure 12:
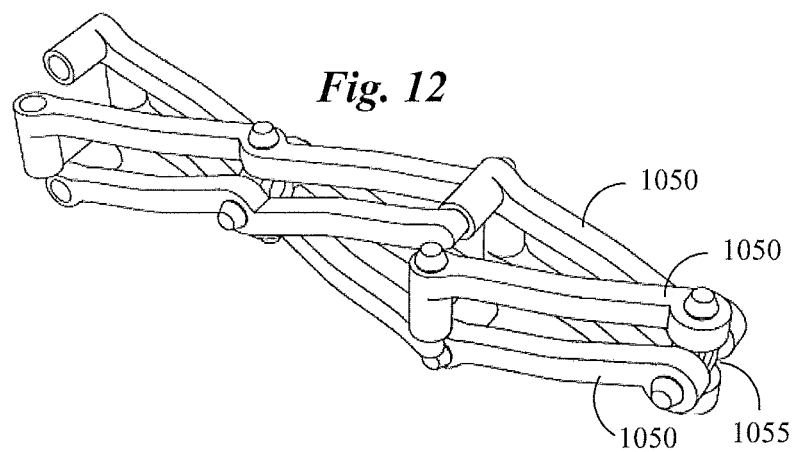
FIG. 12 contains an illustration of the scissor linkage portion of the clawed grasping embodiment.

At the opposite end of the branched scissor linkage 1000 from the claws 1005, the linkage is extended using four half-arms 1050 and another branched rivet 1055 (see FIG. 12). In this example, the half-arms 1050 are shorter than the standard arm parts which was done so that they do not collide with the syringe-like parts 1010 and 1030 discussed below.

Finally, two branched rivet parts have been incorporated into the two syringe-like parts 1010 and 1030 as indicated in the figures. The part that loosely corresponds to the barrel of a syringe is component 1010, which includes two rings 1012 and 1014 that, in this embodiment, are sized to accommodate a user's fingers. Note, though, that those of ordinary skill in the art will be able to devise alternative forms of this embodiment that are much larger if needed. Between the two rings 1012 and 1014 is a channel 1011 sized to slideably accommodate shaft 1032.

Continuing with the embodiment of FIGS. 9-13, the part of device 1000 that operates in a fashion analogous to that of a plunger of a syringe is the component 1030. At its upper terminus is a ring 1033 which, in this embodiment, is sized to accommodate a user's thumb. As discussed previously, at the lower terminus of the component shaft 1032 is a branched rivet 1034.

Note that in this particular embodiment each component of the device 1000 has four protrusions arranged as in a branched rivet at its respective terminus: the arms 1010 attach to these protrusions at their respective termini 1013 and 1034. The thumb syringe part 1030 is threaded through a hole 1011 in the fingers syringe part 1010, allowing the two components to slide against each other. In this particular variation, the geometry of the instant example 1000 does not allow components 1010 and 1030 to easily come apart since the four protrusions 1034 on the component 1030 do not fit through the hole 1011 in the fingers syringe part 1010.

Those of ordinary skill in the art will understand that the grasping device can readily be modified in a number of ways, including, for example, the following variations:

(1) A different branching number could be used, e.g., three arms in each stage could result in a lighter mechanism. However, increasing the number of arms in each stage results in a more robust mechanism that will be capable of resisting larger forces.
(2) A different number of stages of arms in the mechanism could be used. Increasing the number of stages increases the reach of the extended device without significantly increasing the size of the retracted mechanism, although this approach also increases potential "slop" in the mechanism due to the increased number of parts.

Instead of activating the mechanism (and other branched scissor mechanisms) by hand, the syringe parts may be replaced with a linear motor, linear springs, pulleys or other method to pull the two branched rivets together and apart. Alternatively, rotational motors or torsion springs may be applied at hinges, either where two arms meet, where an arm meets a half-arm, or where an arm or half-arm meets a branched rivet. These methods allow the mechanisms to be built at any scale, not only near the scale of a human hand.

The half-arms described here are useful for other devices based on the branched scissor mechanisms. In particular, with the configuration shown in FIG. 12, an object can be attached to the branched rivet connected to the half-arms. Such an object does not block the motion of the mechanism, and is carried along with the extension and retraction of the mechanism.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1 The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A scissor mechanism, comprising:
    (a) a branched rivet containing three or more radially projecting coplanar protrusions spaced apart around a perimeter of said branched rivet, each of said three or more radially projecting coplanar protrusions having a single arm rotatably mounted thereon,
    each of said arms being of equal length,
    each of said arms being rotatable about said protrusion in a single plane,
    each of said arms is rotatably mounted on one of said protrusions at a midpoint of said arm, and,
    each of said arms has
        an orthogonally extending rod attached proximate to an upper end of said arm and
        an orthogonally extending sleeve attached proximate to a lower end of said arm, said rod and said sleeve extending in a direction parallel to each other.

2. A scissor mechanism according to claim 1, wherein said branched rivet has a flat upper surface and a flat lower surface.

3. A scissor mechanism according to claim 1, wherein each of said at least three protrusions comprises a bolt.

4. A scissor mechanism according to claim 3, wherein each of said bolts is removably attached to said branched rivet.

5. A scissor mechanism according to claim 1, wherein said three or more protrusions are equally spaced apart around the perimeter of said branched rivet.

6. A scissor mechanism, comprising:
    (a) a first branched rivet containing three or more radially projecting coplanar first protrusions spaced apart around a perimeter of said branched rivet, each of said first protrusions having a single first arm rotatably mounted thereon, wherein
    each of said first arms is a same first length,
    each of said first arms is rotatable in a single first plane about said first protrusion,
    each of said first arms has
        a first orthogonally extending rod attached proximate to a first upper end of said first arm and
        a first orthogonally extending sleeve attached proximate to a first lower end of said first arm, said first rod and said first sleeve extending in a direction parallel to each other;
    (b) a second branched rivet situated below said first rivet containing a same number of radially projecting coplanar second protrusions as a number of said first protrusions, said second protrusions being spaced apart around a perimeter of said second branched rivet, wherein
    each of said second protrusions has a single second arm rotatably mounted thereon, each of said second arms rotating about a designated one of said second protrusions in a single second plane,
    each of said second arms being of a second equal length, and
    each of said second arms
        having a second orthogonally extending rod proximate to an upper end of said second arm, said second rod rotatably mated with a corresponding first sleeve attached to one of said first arms.

7. A scissor mechanism according to claim 6, wherein said three or more-radially projecting coplanar first protrusions are equally spaced apart around the perimeter of said first branched rivet and said same number of radially projecting coplanar second protrusions are equally spaced apart around the perimeter of said second branched rivet.

8. A scissor mechanism according to claim 6, wherein each of said first arms is rotatably mounted on one of said first protrusions at a midpoint of said first arm and wherein each of said second arms is rotatably mounted on one of said second protrusions at a midpoint of said second arm.

9. A scissor mechanism according to claim 6, wherein each of said at least three first protrusions comprises a first bolt and wherein each of said second protrusions comprises a second bolt.

10. A scissor mechanism according to claim 9, wherein each of said first bolts is removably attached to said first branched rivet, and wherein each of said second bolts is removably attached to said second branched rivet.

11. A scissor mechanism according to claim 6, wherein each of said second arms is rotatably mounted on one of said second protrusions that is situated on an opposite side of said second branched rivet as compared with a corresponding first rivet on which said corresponding first arm is rotatably mounted.

12. A scissor mechanism, comprising:
(a) an upper branched rivet containing three or more radially projecting coplanar upper protrusions spaced apart around a perimeter of said upper branched rivet;
(b) a same number of upper arms as a number of said upper protrusions, each of said upper protrusions having a single one of said upper arms rotatably mounted thereon, wherein
each of said upper arms is a same upper length,
each of said upper arms rotates in a single upper plane about one of said upper protrusions,
each of said upper arms has an orthogonally extending upper rod attached proximate to a lower end of each of said upper arms;
(c) a lower branched rivet situated below said upper branched rivet and containing a same number of radially projecting coplanar lower protrusions as a number of said three or more upper protrusions, said lower protrusions being spaced apart around a perimeter of said lower branched rivet;
(d) a same number of lower arms as a number of said lower protrusions, each of said lower protrusions having a single one of said lower arms rotatably mounted thereon, wherein
each of said lower arms is a same lower length,
each of said lower arms rotates in a single lower plane about one of said lower protrusions,
each of said lower arms has an orthogonally extending lower sleeve situated proximate to an upper end of said lower arm, said lower sleeve being rotatably mated with a corresponding upper rod attached to one of said upper arms.

13. A scissor mechanism according to claim 12, wherein each of said lower arms is rotatably mounted on one of said lower protrusions that is situated on an opposite side of said lower branched rivet as compared with a corresponding upper rivet on which said corresponding upper arm is rotatably mounted.

* * * * *